| United States Patent [19]
Kokubu

[11] Patent Number: 4,564,789
[45] Date of Patent: Jan. 14, 1986

[54] DIMMER FOR USE WITH VEHICLE
[75] Inventor: Sadao Kokubu, Aichi, Japan
[73] Assignee: Kabushiki Kaisha Tokai Rika Denki Seisakusho, Aichi, Japan
[21] Appl. No.: 574,254
[22] Filed: Jan. 26, 1984
[30] Foreign Application Priority Data Jan. 31, 1983 [JP] Japan .................................. 58-12983

[51] Int. Cl.⁴ ........................ B60Q 1/26; B62D 45/00
[52] U.S. Cl. ................................ 315/79; 307/10 LS; 307/120; 307/121; 315/82; 315/DIG. 4
[58] Field of Search ............. 315/79; 307/10 LS, 120, 307/121

[56] References Cited
U.S. PATENT DOCUMENTS

| 2,048,715 | 7/1936 | Sorenson | 315/79 |
| 3,497,708 | 2/1970 | Daugherty | 315/79 |
| 3,634,792 | 1/1972 | Blomenkamp | 315/79 |
| 3,851,208 | 11/1974 | Carmichael et al. | 315/79 |

Primary Examiner—Harold Dixon
Attorney, Agent, or Firm—Shlesinger Arkwright Garvey & Fado

[57] ABSTRACT

A dimmer for use with a vehicle is provided. It has a vehicle speed detector circuit for detecting a state wherein the vehicle speed is within a predetermined range to generate a signal, an acceleration detector circuit for detecting a state wherein the acceleration of the vehicle is less than a predetermined value to generate a signal, switch means for controlling passage of a logical product which is obtained through a logic circuit alone or in combination with the respective signals from said vehicle speed detector circuit, said acceleration detector circuit and said switch circuit, and circuit means for controlling a light source in accordance with the output of said logic circuit. Therefore, the controlling the intensity of the light source to prevent light reflection on the window from the meters, indicators or the like, to eliminate dazzling a driver's eyes and to provide safety driving is carried out in consideration of the acceleration state in addition to the state of vehicle speed, and even in the mode of cruising travel, confirmation of the meters, indicators or the like can be made as necessary by operation of the switch. Thereby, dimming operation can be carried out safety.

10 Claims, 3 Drawing Figures

4,564,789

DIMMER FOR USE WITH VEHICLE

BACKGROUND OF THE INVENTION

The present invention relates to a dimmer for use with vehicle which controls the intensity of a light source for illuminating, at night or the like, various meters such as a speedmeter, a fuel gauge, etc. mounted on the dashboard of an automobile, or a displaying light source which constitutes said meters and indicators themselves.

If the light source mounted on the dash-board of the automobile as described above is too bright, the eyes of a driver directly catch the light therefrom, or the light therefrom is reflected by a window to produce a reflection on the window to dazzle the driver, which is unfavorable for safety driving. Such a phenomenon is particularly liable to occur at night when a difference between circumambient brightness and brightness of light source is great. Therefore, a dimmer has been heretofore provided on the automobile so as to suitably control the brightness of these light sources to meet the circumambient conditions.

However, in the conventional dimmer of this kind, the duty ratio of output pulses of a pulse generator, which generates pulses at fixed frequency, is controlled by varying the resistance of a manually operable variable resistor. Therefore, even during the driving, the dimming operation had to be carried out by manual control of the variable resistor as the occasion demands.

SUMMARY OF THE INVENTION

The present invention has been achieved to overcome these disadvantages noted above with respect to the prior art. It is an object of the invention to provide a dimmer for use with vehicle wherein when the vehicle is driven at a travelling speed within a predetermined range as, for example, in a superhighway where the vehicle is running at a cruising mode, in which case, reducing the intensity of a dashboard light source or disconnecting of the light source poses no particular problem in safety driving of the vehicle, but rather dazzle resulting from the light source poses a problem in safe driving. Thus, reducing the intensity of light or unlighting is carried out, and when the travelling speed is not within the aforesaid predetermined range, said reducing or unlighting is automatically effected, thereby minimizing the manual operation.

DETAILED DESCRIPTION OF THE EMBODIMENTS

One embodiment of the present invention will now be described with reference to the drawings.

Figure 1:
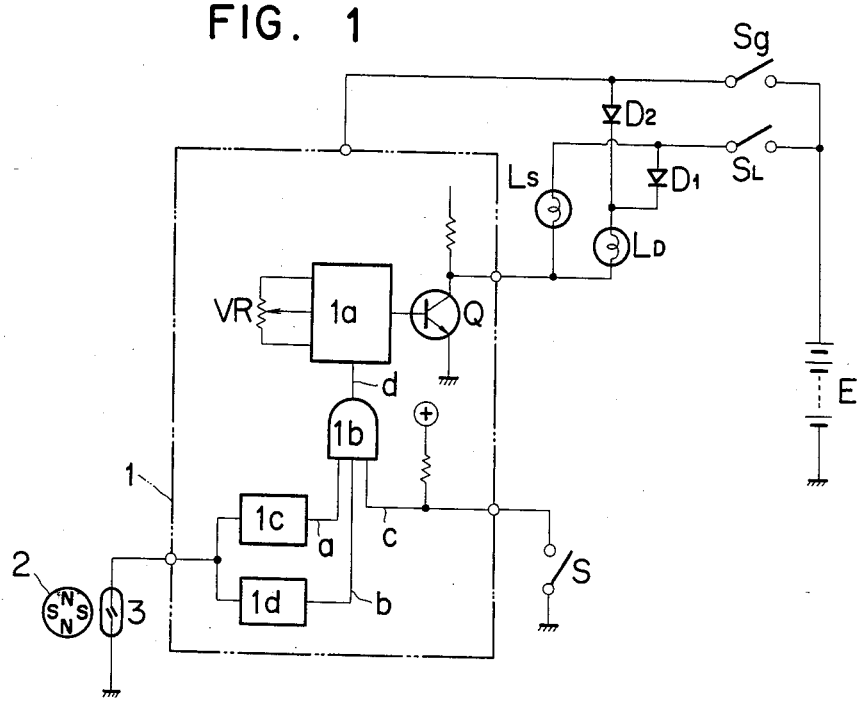
FIG. 1 is an electric circuit diagram showing one embodiment of the present invention.

In FIG. 1, a reference numeral 1 designates a dimmer circuit, to which power is applied from a battery E through an ignition switch Sg. The dimmer circuit 1 has a pulse generator 1a which puts out pulses having a predetermined frequency, and the duty ratio of pulses generated by the pulse generator 1a, that is, a ratio of pulse duration relative to a period of pulse can be varied by varying the resistance of a variable resistor VR. Output of the pulse generator 1a is connected to a base of a transistor Q, which transistor Q can be turned on by the pulse generated by the pulse generator 1a. An emitter of the transistor is grounded. A collector of the transistor is connected to one end of a lamp $L_S$ as an illuminating light source for meters mounted on the dash-board of the automobile and to one end of a lamp $L_D$ as a displaying light source which constitutes meters and indicators themselves. The other end of the illuminating lamp $L_S$ is connected to the battery E through a lighting control switch $S_L$ which is turned on when tail lamps or the like is lit at night, and the other end of the displaying lamp $L_D$ is connected to the battery E through a series circuit of a diode $D_1$ and the lighting control switch $S_L$, and through a series circuit of a diode $D_2$ and the ignition switch Sg which is turned on when an ignition key is inserted.

The pulse generator 1a has a control input to which a control signal of either an H level or L level is applied. When the control signal of L level is applied to the control input, the pulse generator becomes operable to release pulses of the duty ratio set by the variable resistor VR, whereas when the control signal of H level is applied thereto, the pulse generator ceases to operate and the output assumes L level.

Output of an AND circuit 1b is connected to the control input of the pulse generator 1a. And output of a vehicle speed detector circuit 1c, output of an acceleration detector circuit 1d and a normally open manual switch S are connected to the input of the AND circuit 1b. The input of the vehicle speed detector circuit 1c is a pulse train having a frequency corresponding to the vehicle speed generated by a lead switch 3 which is turned on and off by a magnet 2 which is rotated in association with rotation of wheels of the vehicle. When the frequency of the pulse train corresponds to the vehicle speed of 60 km/h to 100 km/h the vehicle is running at a cruising mode, for example, in a superhighway, and a signal of H level is generated at the output thereof. Otherwise a signal of L level is generated.

The input of the acceleration detector circuit 1d is a pulse train similar to that the input of the vehicle speed detector circuit 1c, whereby when a differentiated value of the pulse train is less than a value corresponding to a predetermined acceleration when one vehicle gets ahead of another running vehicle on the superhighway or the like, a signal of H level is generated at the output thereof, and when exceeding a value corresponding to the predetermined acceleration, a signal of L level is generated.

The switch S is normally open, and when it is closed, a third input of the AND circuit 1b is normally applied and the a signal of H level is grounded and an L level output is made.

Figure 2:
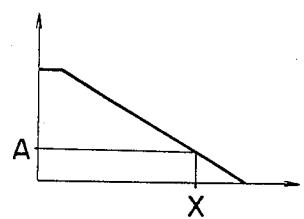
FIG. 2 is a graph showing normal dimming characteristics obtained by the circuit of the FIG. 1.

With the above-described arrangement, for example, when the vehicle speed is less than 60 km/h, output of the vehicle speed detector circuit 1c is at the L level, and therefore, output of the AND circuit 1b is also at the L level, as a consequence of which the pulse generator 1a is operating. At this time, when adjustment is made so as to vary the resistance of the variable resistor VR, the duty ratio of the output pulse of the pulse generator 1a is varied. On-time of the transistor Q is varied accordingly, and the lighting time per hour of the lamp $L_S$ or $L_D$ is increased or decreased, and therefore, the intensity of the light source comprising these lamps $L_S$ and $L_D$ is varied with the adjusting position of the variable resistor VR as shown in FIG. 2.

Figure 3:
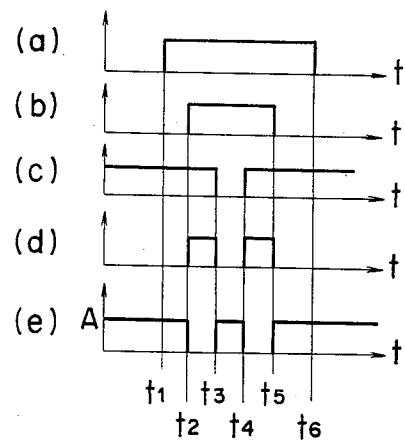
FIG. 3 is a view for the explanation of the operation of the circuit in FIG. 1.

When the vehicle speed is within the range of 60 to 100 km/h at time $t_1$ under such condition that the adjusting position of the variable resistor VR is set to X, output of the vehicle speed detector circuit $1c$ assumes the H level as shown in FIG. 3 (a). When the acceleration of the vehicle is less than a predetermined acceleration at time $t_2$, output of the acceleration detector circuit $1d$ assumes the H level as shown in FIG. 3 (b). Since the switch S is normally open, a signal of H level is at this time applied to the AND circuit $1b$. However, if the switch is closed during the time $t_3 - t_4$, input of the AND circuit $1b$ assumes the L level as shown in FIG. 3 (c) during that time. When the acceleration is increased to a value above the predetermined value at time $t_5$, output of the acceleration circuit $1d$ assumes the L level as shown in FIG. 3 (b). Thereafter, when the vehicle speed is outside the range of 60-100 km/h at the time $t_6$, output of the vehicle speed detector circuit $1c$ assumes the L level as shown in FIG. 3 (a).

Output of the AND circuit $1b$ is varied as shown in FIG. 3 (d) at times, $t_2$, $t_3$, $t_4$ and $t_5$ as the level in various parts varies. The brightness of the lamps $L_S$ and $L_D$ is switched between the lighting state at the level A and unlit state as shown in FIG. 3 (e) in response to variation in level of the output of the AND circuit $1b$, that is, variation in control signal.

While in the above-described embodiment wherein the duty ratio of the output pulse of the pulse generator $1a$ is varied to effect dimming, the operation of the pulse generator $1a$ is stopped to thereby control cut off. It should be noted that the duty ratio can be varied to control reduction of the intensity of light without stopping the operation of the pulse generator $1a$.

Alternatively, in an arrangement wherein a lamp is lit at a given brightness without being provided with the pulse generator $1a$, the lamp can be reduced in intensity or unlighted.

Moreover, while in the above-descirbed embodiment, the lighting state of the lamp has been controlled by the logical product of states of the vehicle speed, acceleration and switch, it should be noted that said controlling can also be effected at least by whether or not the vehicle speed is within the predetermined range to achieve the object of the present invention.

As described above, according to the present invention, whether the vehicle speed is within a predetermined range is detected to generate a signal, and the brightness of the light source is reduced or the light source is unlighted in accordance with said signal. Therefore, when the vehicle takes the mode of cruising travel in the superhighway or the like, the meters, indicaters or the like are automatically reduced in brightness or unlighted to prevent reflection on the window resulting from reflection of light from the meters, indicators or the like, to eliminate dazzling of the driver's eyes, and to provide safety driving. When the vehicle speed is outside the predetermined range, lighting is automatically returned to its original lighting state to render confirmation of the meters, indicaters or the like as required possible.

In summary, in the present invention, the reducing of intensity of the light source or unlighting is carried out in consideration of the acceleration state in addition to the state of vehicle speed, and also in the mode of cruising travel, confirmation of the meters, indicators or the like can be made as necessary by operation of the switch. Thereby, the dimming operation can be carried out in safety.

What is claimed is:

1. A dimmer for use with a vehicle comprising
   sensing means for sensing a vehicle speed to generate a first signal corresponding thereto;
   vehicle speed detecting means for receiving said first signal and detecting a substantial vehicle speed which is within a predetermined range to generate a second signal;
   circuit means for controlling a light source in accordance with said second signal from said vehicle speed detecting means; and
   a logic circuit for producing an output to operate said circuit means.

2. A dimmer for use with a vehicle according to claim 1, further comprising
   vehicle acceleration detecting means for receiving said first signal and detecting a substantial vehicle acceleration which is less than a predetermined value to generate a third signal, said logical circuit producing said logic output by multiplying the second signal and said third signal, said circuit means operating in accordance with said logical product.

3. A dimmer for use with a vehicle according to claim 1, further comprising
   switching means for producing a fourth signal by manual operation, said logic circuit producing said logic output by multiplying the second signal and said fourth signal, said circuit means operating in accordance with said logic output.

4. A dimmer for use with a vehicle according to claim 3, wherein said logic circuit includes an AND circuit and said switching means produces said fourth signal, said forth signal entering an input of said AND circuit.

5. A dimmer for use with a vehicle according to claim 3, wherein said switching means in a normally open switch.

6. A dimmer for use with a vehicle according to claim 5, wherein said normally open switch is grounded at a first end thereof and is directly connected at a second end thereof to said input of the logic circuit for sending said forth signal, said second end being adapted to be held at two levels, and said two levels including a "H" level and a "L" level.

7. A dimmer for use with a vehicle according to claim 1, further comprising
   vehicle acceleration detecting means for receiving said first signal and detecting a substantial vehicle acceleration which is less than a predetermined value to generate a third signal; and
   switching means for producing a fourth signal by manual operation, said logic circuit producing said logic output by multiplying the second signal, said third signal and said fourth signal, and said circuit means operating in accordance with said logical output.

8. A dimmer for use with a vehicle according to claim 7, wherein said logic circuit includes an AND circuit and said switching means produces said fourth signal, said fourth signal entering an input of said AND circuit.

9. A dimmer for use with a vehicle according to claim 1, wherein said circuit means includes
   a pulse generator for generating a pulse train with a variable duty ratio;
   a variable registor; and
   a driving device to be controlled by said pulse generator to drive said light source, said pulse generator being controlled to vary said duty ratio in accordance with an adjusting position of said variable registor.

10. A dimmer for use with a vehicle according to claim 9, wherein said driving device is a transistor.

* * * * *